United States Patent [19]
Abraham et al.

[11] Patent Number: 5,831,179
[45] Date of Patent: Nov. 3, 1998

[54] COMBINATION DYNAMOMETER AND TORSIONAL DAMPING APPARATUS

[75] Inventors: Andrew J. Abraham, Sterling Heights; Brian R. Leslie, Rochester Hills, both of Mich.

[73] Assignee: Illinois Tool Works Inc., Glenview, Ill.

[21] Appl. No.: 961,312

[22] Filed: Oct. 30, 1997

Related U.S. Application Data

[62] Division of Ser. No. 709,862, Sep. 10, 1996.

[51] Int. Cl.⁶ ........................................................ G01L 3/04
[52] U.S. Cl. .......................................................... 73/862.09
[58] Field of Search ................................. 464/64, 67, 68; 192/3, 31, 3.29, 3.28; 74/572; 73/862.09, 862.11, 862.12, 862.13, 862.14, 862.15, 862.16, 862.17, 862.18

[56] References Cited

U.S. PATENT DOCUMENTS

| | | | |
|---|---|---|---|
| 3,456,498 | 7/1969 | Jaeschke . | |
| 3,505,863 | 4/1970 | Lucia . | |
| 3,942,363 | 3/1976 | Swis et al. . | |
| 4,036,049 | 7/1977 | Hanson . | |
| 4,441,594 | 4/1984 | Kubo et al. .......................... | 192/3.28 |
| 4,441,595 | 4/1984 | Lamarche ............................. | 192/3.29 |
| 4,457,165 | 7/1984 | Wiederrich . | |
| 4,484,898 | 11/1984 | Kohno .................................... | 464/64 |
| 4,493,674 | 1/1985 | Tamura et al. ........................ | 464/68 |
| 4,530,673 | 7/1985 | Lamarche ............................... | 464/64 |
| 4,572,339 | 2/1986 | Koshimo ................................ | 192/3.31 |
| 4,656,576 | 4/1987 | Kawarabayashi . | |
| 4,995,257 | 2/1991 | Leon . | |
| 5,095,771 | 3/1992 | Kuhne ...................................... | 74/572 |
| 5,195,038 | 3/1993 | Yagi et al. . | |
| 5,218,860 | 6/1993 | Storar . | |
| 5,269,199 | 12/1993 | Umeyama . | |
| 5,269,725 | 12/1993 | Maucher et al. . | |
| 5,307,710 | 5/1994 | Feldhaus et al. . | |
| 5,349,883 | 9/1994 | Reik et al. . | |
| 5,355,747 | 10/1994 | Kajitani et al. . | |
| 5,367,920 | 11/1994 | Bonfilio . | |
| 5,377,560 | 1/1995 | Schierling et al. . | |
| 5,471,896 | 12/1995 | Schierling et al. . | |

OTHER PUBLICATIONS

"LUK Dual Mass Flywheel", LUK brochure, pp. 1–7, Dec. 14, 1995.

*Primary Examiner*—Ronald L. Biegel
*Attorney, Agent, or Firm*—Donald J. Breh

[57] ABSTRACT

A dynamometer in combination with a torsional damping apparatus for damping torsional vibration between a prime mover and the dynamometer. The torsional damping apparatus includes a body plate rotatably coupled to a finger plate by a bearing, wherein the torsional damping apparatus interconnects the dynamometer and the prime mover. The finger plate includes a plurality of substantially radially outwardly protruding finger members engageable with a plurality of spring members at least partially disposed in corresponding recesses arranged about the rotation axis on the inner side of the body plate. An outer retainer ring removably coupled on the inner side of the body plate over the plurality of spring members for retaining the spring members in the corresponding recesses of the body plate. The finger members are engageable with the plurality of spring members to compress the plurality of spring members in response to relative rotational movement between the body plate and the finger plate about the rotation axis, wherein the spring members dampen torsional stress transmitted from the prime mover to the dynamometer.

8 Claims, 3 Drawing Sheets

COMBINATION DYNAMOMETER AND TORSIONAL DAMPING APPARATUS

CROSS REFERENCE TO RELATED APPLICATION

The present application is a division of copending U.S. application No. 08/709,862 filed 10 Sep. 1996 and entitled "Dynamometer torsional Damping Apparatus and Method", assigned commonly herewith.

BACKGROUND OF THE INVENTION

The invention relates generally to torsional vibration damping, and more particularly to a dynamometer in combination with a damping apparatus for damping torsional vibration between the dynamometer and a combustion engine, or prime mover.

Dynamometers are used generally for measuring the performance of rotating machinery including combustion engines and drive trains, which are alternatively referred to herein as prime movers. The automotive industry, for example, uses dynamometers to measure a variety of parameters related to vehicle combustion engine performance including output torque and horsepower during engine testing, which often lasts several hundreds of engine operating hours. The dynamometer testing is generally performed over engine operating speeds ranging between idle and maximum rated speed and under different loading conditions. The advent of smaller, lighter weight and more fuel efficient automotive engines has resulted in a tendency toward higher engine operating speeds, which are required to perform the same as did larger predecessor engines. And in modern automotive engines, speeds range between approximately 800 rpm at idle speed and up to approximately 10,000 rpm, which may be more or less depending oil engine size and application.

In a typical engine dynamometer test configuration, an output shaft of the engine is coupled to an input shaft of the dynamometer. A rubber element drive shaft section disposed, or interconnected, between the dynamometer and the engine isolates the dynameter from engine induced vibration, and in particular from torsional vibration resulting primarily from pulses during combustion engine power strokes. One type of rubber element drive shaft used commonly in these applications is available commercially from Dana Corporation, Toledo, Ohio under the mark VIBRAD-AMPS®. Combustion engines operated at lower speeds have longer durations between power strokes, and thus produce relatively more torsional vibration and stress than engines operated at higher speeds. Similarly, engines with fewer cylinders produce relatively more torsional stress than engines with greater numbers of cylinders, which results from the relatively increased duration between power strokes in engines having fewer cylinders. Many engines moreover have odd cylinder firing patterns, which increases the amount of torsional vibration transmitted by the drive shaft.

At present, several different rubber element drive shafts are coupled interchangeably between the engine and the dynamometer during the course of engine performance testing. Each rubber element drive shaft has different damping characteristics for use during operation at different engine speed ranges. The different rubber element drive shafts also vary in weight between approximately 45 and 75 pounds. At lower engine operating speeds larger diameter, heavier weight rubber element drive shafts are required to absorb the relatively high torsional stresses, whereas at higher engine operating speeds smaller diameter, lighter weight and more rigid rubber element drive shafts are used. Interchanging these different rubber element drive shafts one or more times over the course of engine performance testing however is laborious and time consuming work, which interrupts usually tight testing schedules. The installation must usually be performed by skilled technicians to ensure proper installation, which is required for accurate test results and to prevent equipment damage. Also, the heavier weight rubber element drive shafts used in many lower speed operations exceed the bearing load rating of many dynamometers.

Rubber elements shafts are rated in units of twist or deflection per unit of torque. Rubber element shafts have a tendency to deteriorate as a result of internal heating when subject to excessive stress, and the shafts may be irreversibly damaged by excessive stress lasting only several milliseconds. The use of an under-rated rubber element drive shaft in a particular dynamometer application therefore may result in the destruction of the drive shaft, which is costly to replace. In addition, deterioration of a rubber element shaft may result in damage to the dynamometer. Rubber element drive shafts tends also to be inherently imbalanced as a result of the rubber element composition. At lower engine speeds the adverse effect of the imbalance tends to be negligible, but at higher speeds the imbalanced drive shafts tend to wobble or whip, which may damage equipment and pose a personnel safety hazard. Furthermore, there tends to be substantial variation among the damping and performance characteristics of commonly rated rubber element drive shafts, which adversely affects the consistency of measurement results.

In view of the discussion above among other considerations, there exists a demonstrated need for all advancement in the art of dynamometer torsional damping.

It is therefore an object of the invention to provide a novel dynamometer torsional damper apparatus that is economical and overcome problems with the prior art.

It is also an object of the invention to provide a novel dynamometer damping apparatus that is relatively lightweight, and is readily adaptable for coupling to a variety of different dynamometers.

It is another object of the invention to provide a novel dynamometer damping apparatus for readily changing or adjusting the damping characteristic for different dynamometer testing applications.

It is a further object of the invention to provide a novel dynamometer damping apparatus for damping torsional vibration and reducing stress between a dynamometer and a prime mover over a relatively wide range of rotational operating speeds without changing the interchanging the damping apparatus.

It is a yet another object of the invention to provide a novel dynamometer with a body plate having a protruding central hub portion interconnected rotatably by an antifriction bearing to a finger plate disposed about the protruding central hub portion, wherein the interconnecting portions of the body plate and the finger pate have a relatively long axial dimension for improved mechanical integrity and performance.

These and other objects, features and advantages of the present invention will become more fully apparent upon consideration of the following Detailed Description of the Invention with the accompanying Drawings, which may be disproportionate for ease of understanding, wherein like structure and steps are referenced by corresponding numerals and indicators.

DETAILED DESCRIPTION OF THE INVENTION

Figure 1:
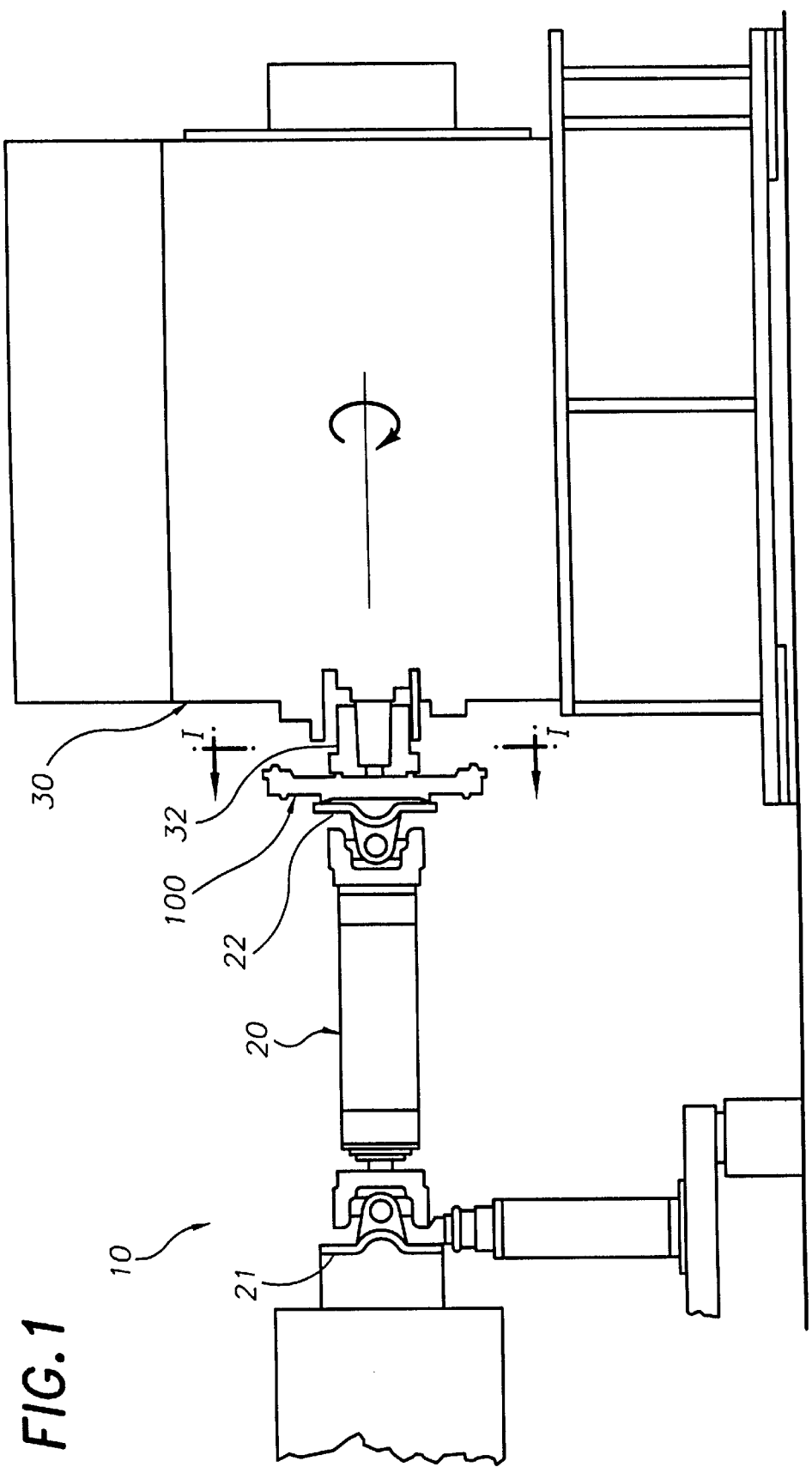
FIG. 1 is an elevational view of a engine dynamometer test arrangement according to an exemplary embodiment of the invention.

FIG. 1 is an elevational view of a engine dynamometer test arrangement 10 including a combustion engine drive shaft 20 interconnected to a dynamometer 30 by a dynamometer damping apparatus 100 for measuring a variety of engine performance parameters over a wide range of operating speeds and loading conditions. More specifically, an engine that drives the drive shaft 20, not shown in the drawing is coupled to a flange 21 at an end of the drive shaft 20, and a flange portion 22 of the drive shaft 20 is coupled to a drive side of the damping apparatus 100. An input shaft 32 of the dynamometer 30 is coupled, either directly or indirectly, to an output side of the dynamometer damping apparatus 100. In the exemplary embodiment, the input shaft flange 32 of the dynamometer is part of a hydraulic hub coupled to the damping apparatus 100.

Although the exemplary embodiments of the invention are disclosed in the context of a combustion engine dynamometer test cell arrangement, the invention is applicable to dynamometers coupled to any type of rotating machinery, which is referred to herein generally as a prime mover. Still more generally, however, many of the features, aspects and advantages of the invention are applicable to the coupling of any two or more rotatable members, which rotate about a common axis.

Figure 2:
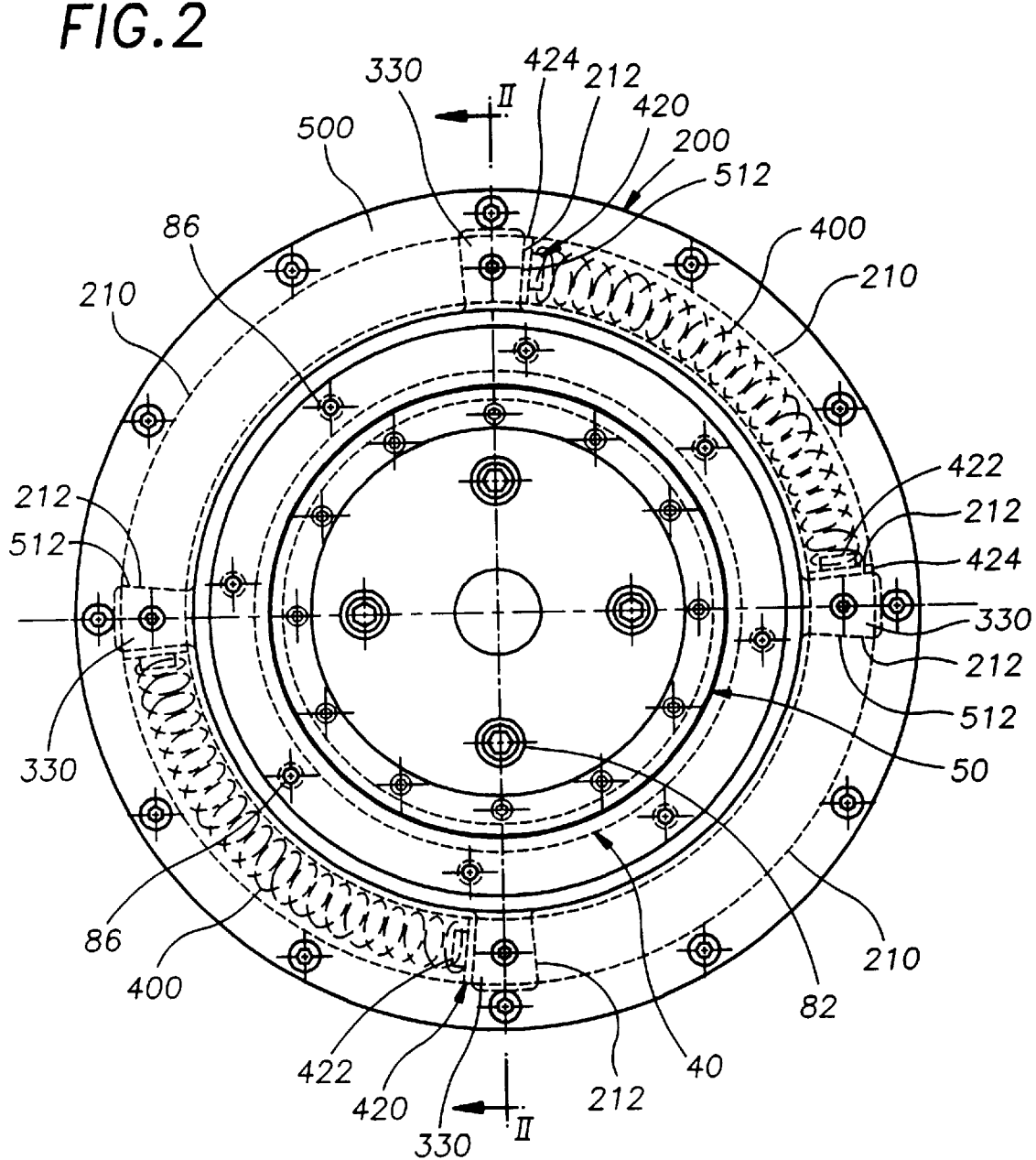
FIG. 2 is a partial end view of a dynamometer torsional damping apparatus taken along lines I—I of FIG. 1 according to an exemplary embodiment of the invention.
Figure 3:
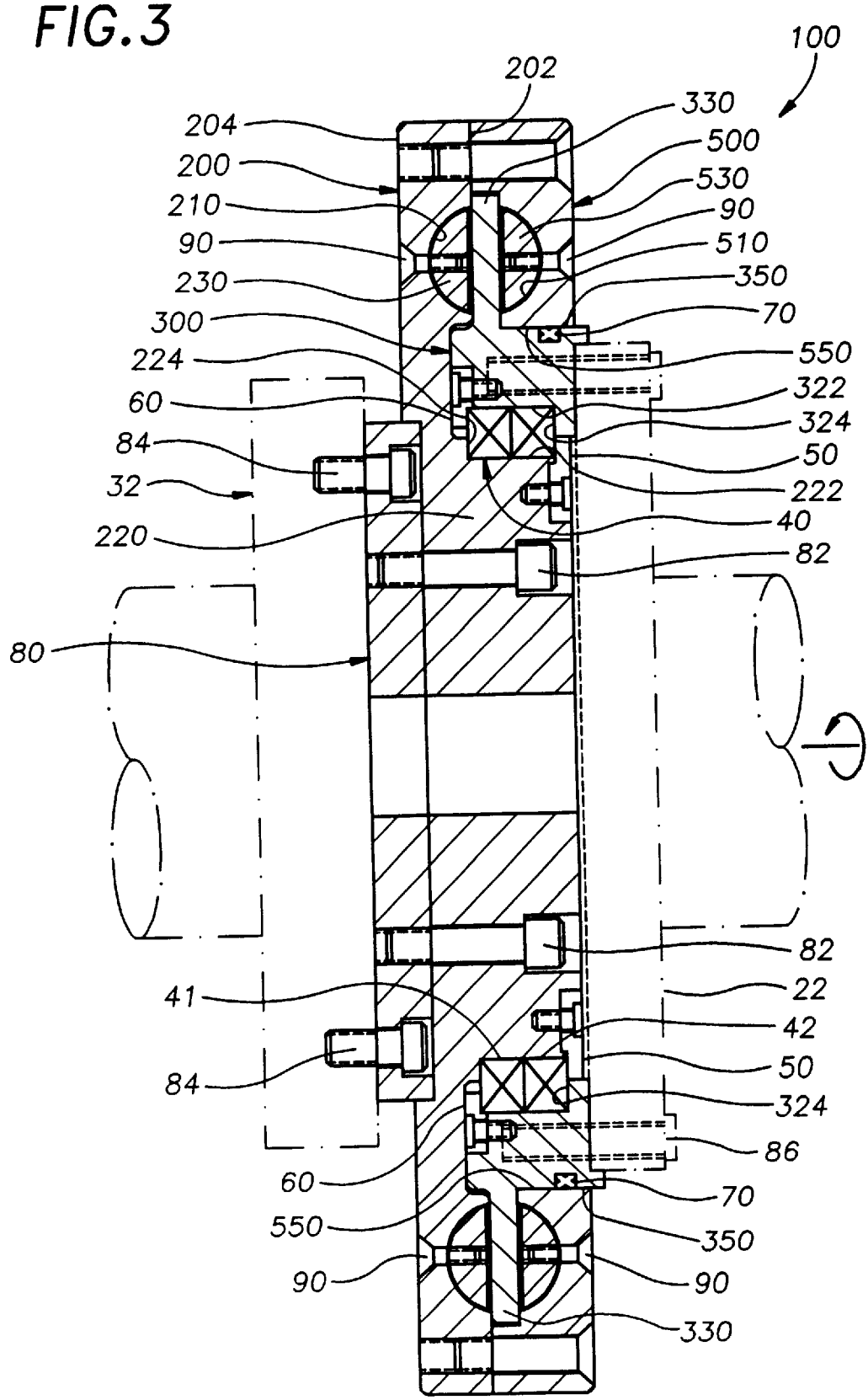
FIG. 3 is a partial sectional view of the dynamometer torsional damping apparatus taken along lines II—II of FIG. 2.

FIG. 2 is a partial end view of an exemplary dynamometer damping apparatus 100 taken along lines I—I of FIG. 1, and FIG. 3 is a partial sectional view taken along line II—II of FIG. 2. The exemplary damping apparatus 100 includes generally a body plate 200 rotatably coupled to a finger plate 300. The body plate 200 and the finger plate 300 are cooperatively engageable to compress a plurality of spring members 400 interconnected therebetween in response to relative rotational movement between the body member 200 and the finger plate 300 about a common rotation axis to dampen torsional stress therebetween.

FIGS. 2 and 3 show an annular antifriction bearing 40 interconnecting the body plate 200 and the finger plate 300. The body plate includes a hub portion 220 with an outer circumferential surface 222 protruding from the inner side 202 of the body plate 200, and the finger plate includes a central bore with an inner circumferential surface 322. The bearing 40 is retained about the outer circumferential surface 222 of the body plate 200 and within the inner circumferential surface 322 of the finger plate 300. More specifically, the antifriction bearing 40 has an inner race retained about the outer circumferential surface 222 of the body plate 200 and an outer race retained within the inner circumferential surface 322 of the finger plate 300. The antifriction bearing 40 is press fit between the body plate 200 and the finger plate 300. In the exemplary embodiment, a portion of the annular bearing 40 is retained between a bearing seating surface 224 of the body plate 200 and a first annular bearing retainer 50, and another portion of the annular bearing 40 is retained between a bearing seating surface 324 on the finger plate 300 and a second annular bearing retainer 60.

According to another aspect of the invention, the circumferential surface 222 has a relatively wide axial dimension corresponding to a substantially complementary axial dimension on the inner circumferential surface 322 of the finger plate 300. These relatively wide axial surfaces 222 and 322 provide for a precise and stable rotational coupling between the body plate 200 and the finger plate 300, wherein the damping apparatus 100 maintains its mechanical integrity over a wide range of rotational speeds and when subjected to relatively large amounts of torsional stress. In the exemplary embodiment, at least two adjacent antifriction bearings 41 and 42 interconnect rotatably the body plate 200 and the finger plate 300. And according to one embodiment, the antifriction bearings 40 are angular contact bearings, which can withstand both radial and thrust loads. These exemplary angular contact bearings are available from the Kaydon Bearing Company, Part No. KC047XPO.

FIG. 2 shows the plurality of spring members 400 at least partially disposeable in corresponding recesses 210 with opposing end portions 212 arranged about the rotation axis on an inner side 202 of the body plate 200. FIG. 3 shows an outer ring retainer 500 removably coupled to the inner side 202 of the body plate 200 over the plurality of spring members 400 for retaining the spring member 400 in the corresponding recesses 210 of the body plate 200. In the exemplary embodiment of FIGS. 2 and 3, the outer ring retainer 500 also includes a plurality of recesses 510 with opposing end walls 512 arranged about the rotation axis. The recesses 510 and end walls 512 of the outer ring retainer 500 are alignable with the recesses 210 and end walls 212 of the body plate 200, wherein the plurality of spring members 400 are also at least partially disposed in the recesses 510 of the outer ring retainer 500 and between its end walls 512 when the outer ring retainer 500 is coupled to the body plate 200.

According to the exemplary embodiment of FIG. 2, the recesses 210 with opposing end walls 212 of the body plate 200 are defined by a plurality of stop blocks 230 mounted in an annular recess formed in the body plate 200. Similarly, the recesses 510 with opposing end walls 512 of the outer ring retainer 500 are defined by a plurality of stop blocks 530 mounted in an annular recess formed in the outer ring retainer 500. According to a related aspect of the invention, the stop blocks 230 and 530 are retained in the annular recesses by machine screws 90, which are designed to shear under excessive torque loading conditions as a safety feature. In one applications, the screws shear at approximately 3400 ft lbs torque.

FIGS. 2 and 3 show the finger plate 300 including a plurality of substantially outwardly protruding finger members 330 disposed between opposing stop blocks 230. The finger members 330 are engageable with the plurality of spring members 400 to compress the plurality of spring members 400 in response to relative rotation of between the body plate 200 and the finger plate 300, wherein the spring members dampen torsional vibration between the body plate 200 and the finger plate 300. FIG. 3 shows the opposing stop blocks 230 and 530 defining a space therebetween, wherein the each finger member 330 is positionable and movable between a corresponding pair of opposing stop blocks during relative rotation movement between the body plate 200 and the finger plate 300. FIG. 2 shows opposing sides of the finger members 330 in substantial alignment with the end walls 212 and 512 defined by the stop blocks 230 and 530 when the finger plate 300 is in a biased, no load position relative to the body plate 200. As a transient torsional load is applied between the body plate 200 and the finger plate 200, the finger plate 300 rotates relative to the body plate 200 and the fingers members 330 engage and compress the spring members 400, which dampen the torsional load.

According to another aspect of the invention, the outer ring retainer 500 is readily removably coupleable to the body plate 200 to permit adding, removing and interchanging spring members 400 to change the damping characteristic of the apparatus 100. According to the invention, the plurality of spring members 400 includes at least two spring members 400 disposed in corresponding recesses 210 in the body plate 200 as shown in FIG. 2. The exemplary embodiment, however, includes additional recesses 210 for receiving additional spring members 400, not shown in the drawing, wherein the spring members 400 are arranged generally symmetrically about the rotation axis. The invention also encompasses other embodiments having more than four spring members. The spring members are generally wire wound coil springs. Each spring member is, for example, rated between approximately 100 and 500 inchpounds, which rating may be more or less depending on the particular application. In one embodiment, the spring members are chrome silicon springs available from Lee Spring Company, Part No. LHL-1000C-12.

In the exemplary embodiment of FIG. 2, an end cap 420 is disposed between end portions of the spring members 400 and the end walls 212 and 512 of the recesses 210 and 510. The end caps 420 include a hub portion 422, which may be press fit within an end portion of the coil spring member, and a base portion 424 engageable with the end walls 212 and 512.

According to another aspect of the invention, the spring members 400 are lightly coated with a lubricant to reduce frictional contact between the spring members 400 and the recesses 210 and 510 during movement of the spring members. According to a related aspect of the invention, an annular seal 70 is disposed between an outer circumferential surface 350 of the finger plate 300 and an inner circumferential surface 550 of the outer ring retainer 500. The annular seal 70 prevents seepage of any lubricant, which has a tendency to become viscous when heated, out from the recesses 210 and 510. In the exemplary embodiment, the annular seal 70 is an annular quad-ring available from the Zatkoff Company, Part No. 262.

According to another aspect of the invention, an adapter plate 80 is removably and interchangeably coupled to the outer surface 204 of the body plate 200 by a plurality of bolts 82 extended through inner side 202 of the body plate 200. The adapter plate 80 is coupleable to one of either the dynamometer drive shaft flange 32 and the prime mover drive shaft flange 22 by a second plurality of bolts 84. The other of the prime mover drive shaft flange 22 and the dynamometer drive shaft flange 32 is coupleable to the finger plate 300 by a third plurality of bolts 86. In the exemplary embodiment of FIGS. 1 and 3, a shaft flange 32 of the dynamometer 30 is coupled to the adapter plate 80 of the body plate 200, and the shaft flange 22 of the prime mover drive shaft is coupled to the finger plate 300.

According to yet another aspect of the invention, the damper apparatus 100 weighs between approximately 15 and 20 pounds. This relatively lightweight reduces the load on the dynamometer shaft, which reduces wear on the dynamometer 30. In one embodiment, the body plate 200 is made from aluminum or some other lightweight material, which reduces substantially the overall weight of the damping apparatus 100. The finger plate 300 and the stop blocks 230 and 530 however are made from a steel material or some other relatively strong material, which will withstand the forces exerted thereon during operation of the apparatus 100.

While the foregoing written description of the invention enables anyone skilled in the art to make and use what is at present considered to be the best mode of the invention, it will be appreciated and understood by anyone skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. A dynamometer in combination with a torsional damping apparatus for damping torsional vibration generated by a prime mover coupled to the dynamometer, the combination comprising:

a body plate rotatable about a rotation axis, the body plate having an inner side and a substantially opposing outer side, and the outer side of the body plate coupleable to one of the dynamometer and the prime mover;

a finger plate with a plurality of substantially radially outwardly protruding finger members, the finger plate having an inner side and a substantially opposing outer side, the finger plate rotatably coupled to the body plate wherein the finger plate is rotatable about the rotation axis, and the outer side of the finger plate coupleable to one of the dynamometer and the prime mover;

a plurality of spring members at least partially disposed in corresponding recesses arranged about the rotation axis on the inner side of the body plate, opposing end portions of each spring member disposed between and engageable with corresponding end walls of each corresponding recess, and each of the plurality of finger members engageable with an end portion of at least one spring member;

an outer retainer ring removably coupled on the inner side of the body plate over the plurality of spring members, the outer retainer ring retaining the spring members in the corresponding recesses of the body plate, wherein the finger members are engageable with the plurality of spring members to compress the plurality of spring members in response to relative rotational movement between the body plate and the finger plate about the rotation axis, and wherein the spring members dampen torsional stress transmitted from the prime mover to the dynamometer.

2. The combination of claim 1 further comprising an antifriction bearing interconnecting rotatably the body plate and the finger plate, the bearing retained about an outer circumferential surface of a hub protruding from the inner side of the body plate, and the bearing retained within an inner circumferential surface of the finger plate.

3. The combination of claim 2 wherein the antifriction bearing includes at least two adjacent angular contact bearings, each bearing having an inner race retained about the outer circumferential surface of the hub protruding from the inner side of the body member, and each bearing having an outer race retained within the inner circumferential surface of the finger plate.

4. The combination of claim 1, the outer retainer ring having recesses arranged about the rotation axis, the plurality of spring members at least partially disposed in corresponding recesses in the outer retainer ring when the outer retainer ring is coupled to the body plate, opposing end portions of each spring member engageable with corresponding end walls of each corresponding recess in the outer retainer ring, the end walls in the body plate are aligned opposite the end walls in the outer retainer ring and define a space therebetween, wherein the finger members are positioned and movable between opposing end walls to compress the spring members during relative rotational movement between the body plate and the finger plate about the rotation axis.

5. The combination of claim 4, the recesses with opposing end walls of the body plate defined by a plurality of spaced stop blocks mounted in an annular recess formed in the body plate, and the recesses with opposing end walls of the outer retainer ring defined by a plurality of spaced stop blocks mounted in an annular recess formed in the outer retainer ring.

6. The combination of claim 5, the body plate is aluminum and the finger plate and stop blocks are steel.

7. The combination of claim 5 weighing between approximately 15 and 20 pounds.

8. The combination of claim 1 further comprising an adapter plate removably coupled to the outer side of the body plate.

\* \* \* \* \*